J. H. GUGLER.
SELF STARTING DEVICE FOR STORAGE BATTERY PLANTS.
APPLICATION FILED MAY 16, 1913.
1,248,848.
Patented Dec. 4, 1917.
3 SHEETS—SHEET 1.
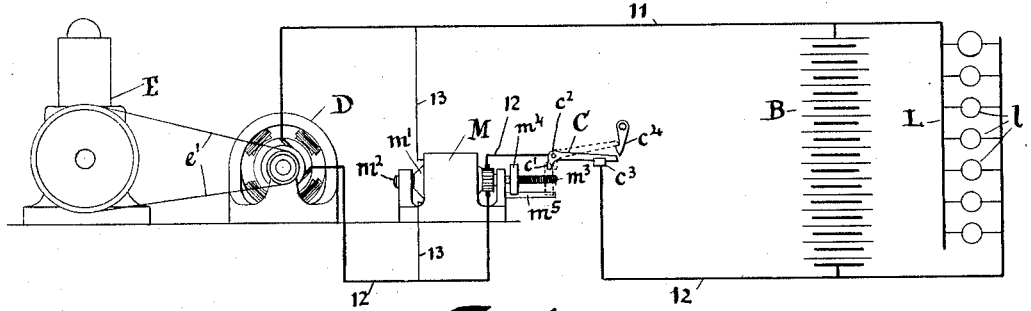
Fig. 1
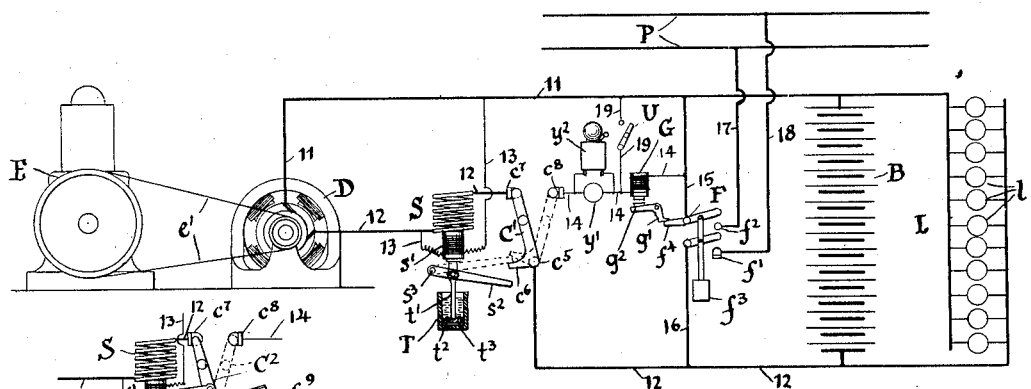
Fig. 2
Fig. 3
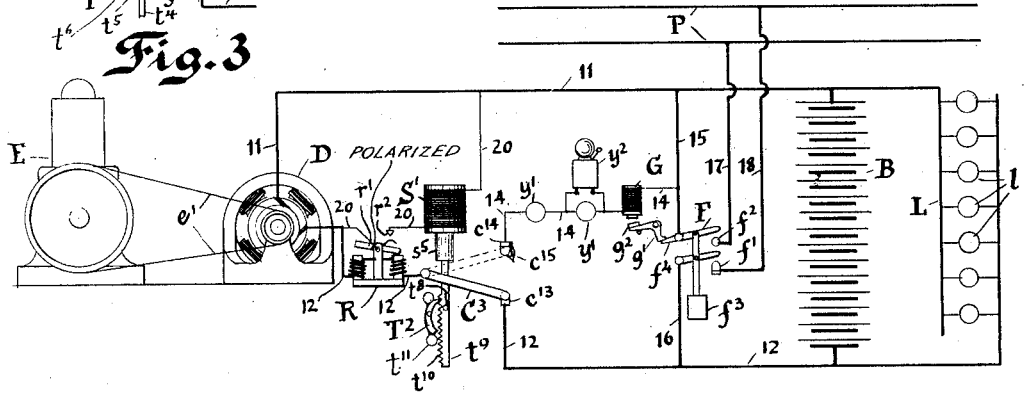
Fig. 4
Witnesses
Frederick D. Tucker,
Eleanor Pink
Julius H. Gugler, Inventor
By George Whitmore Colles
Attorney J. H. GUGLER.
SELF STARTING DEVICE FOR STORAGE BATTERY PLANTS.
APPLICATION FILED MAY 16, 1913.

1,248,848.

Patented Dec. 4, 1917.
3 SHEETS—SHEET 2.

Julius H. Gugler, Inventor

Witnesses
Frederick D. Tucker
Eleanor T. Fink

By George Whitmore Collins
Attorney

UNITED STATES PATENT OFFICE.

JULIUS H. GUGLER, OF MILWAUKEE, WISCONSIN.

SELF-STARTING DEVICE FOR STORAGE-BATTERY PLANTS.

1,248,848.  Specification of Letters Patent.  Patented Dec. 4, 1917.

Application filed May 16, 1913. Serial No. 768,075.

*To all whom it may concern:*

Be it known that I, JULIUS H. GUGLER, of Milwaukee, Wisconsin, have invented a Self-Starting Device for Storage-Battery Plants, of which the following is a specification.

This invention relates to automatic regulating-devices for electric-lighting plants, the present device being intended for use in connection with an electric circuit containing an operating storage-battery, a service-circuit having translating-devices, a dynamo adapted both to charge the battery and deliver current to the service-circuit, and an internal-combustion engine driving said dynamo.

Such circuits are at the present time in common use and coming increasingly into favor for small plants for the reason that internal-combustion engines are not only more efficient but also less expensive to install and to operate than steam-engines. Such engines, however, as is well understood, cannot start themselves without special starting-devices, and therefore the practice has arisen of using the dynamo to start the engine, it being in this case driven as a motor by the use of current from the battery until the engine has been turned over for a few times and has begun to operate; after which, of course, the speed of the dynamo will be so accelerated as to reverse the current and send it into the battery to charge the latter, or to the service-circuit.

A plant so arranged is, however, subject, especially where automatic means are provided for starting the engine, as by closing the dynamo-circuit when the battery drops below a predetermined voltage, to the occasional difficulty inherent in internal-combustion engines, that the engine at times fails to operate, whether from faulty ignition, shortage of fuel, improper carburetion or some other cause. In such case, if the dynamo be thrown into circuit under the conditions named, it will not only turn over the engine but continue to drive the same, and it may be impossible to tell from appearances whether the engine is actually operating or not. If the start is made automatically or in the absence of an attendant, then the engine will keep on being driven by the dynamo and the latter will continue to use up current, until the battery is finally exhausted.

It is the object of the present invention to provide an automatically operating means which shall, in case of the appearance of such a defect, promptly cut out the dynamo from the circuit and prevent it from being cut into circuit again until the defect has been remedied. More particularly, the object of the present invention is to provide a device which, as soon as the dynamo begins to operate as a motor driving the engine, shall after a predetermined allowance of time, suitable for making the start if the engine is in order, cut out the dynamo if it still continues to act as a motor; but which, if the dynamo changes to a generator, due to effective operation of the engine, within said predetermined time-allowance, shall not operate but remain in its original position.

I further aim, by an extension of the principal idea, not merely to cut out the circuit in case the engine fails to pick up and drive within the given time, but also to close a signal or alarm-circuit, thereby giving notice to the proper party, either in the same apartment with the plant or at some distant point.

I further aim, as another subordinate improvement on the main principle of the invention, to provide means whereby in case of such failure on the part of the engine, another supply circuit, as for example a public lighting main, may be cut into circuit with the battery so as to take the place of the dynamo in charging the battery and supplying current to the service-circuit.

In some cases also, I may provide means whereby the ignition-circuit of the engine is cut out entirely in case of such failure to operate.

My invention also has in view, in its most complete form, the provision of means for running an isolated lighting plant by means of a storage-battery and a dynamo driven by an internal-combustion engine entirely automatically, starting and stopping the latter as the state of the battery may require, and in every case providing for a prompt cutout of the dynamo-circuit and shut-off of the engine as soon as the latter fails to drive properly after a predetermined period has elaspsed sufficient to keep out of consideration any momentary failures of the cylinder-charge to ignite.

It is further to be observed that according to my novel principle of operation an automatic cutout of the dynamo-circuit in case of failure of the engine to operate is provided for not merely at starting but in case at any time during operation the engine ceases to drive, the aforesaid predetermined interval of time being in each case allowed the engine in which to pick up in case of momentary failure.

Other auxiliary devices and arrangements may be provided in connection with the aforesaid main principle, such auxiliary devices being hereinafter described in detail and particularly specified in my claims.

In the following detailed description of my invention which is to be read in connection with the accompanying drawings, I have described a number of different forms which my invention may assume, proceeding from the more simple to the more complex.

In the aforesaid drawings, which show the different devices and electrical connections schematically, Figure 1 represents the application of my invention to a circuit of the type described in one of its simplest forms;

Fig. 2 represents a more elaborated form than Fig. 1 providing for an automatic signal, etc.;

Fig. 3 illustrates a more improved form of the automatic cutout shown in Fig. 2;

Fig. 4 illustrates another form of the invention alternative to Fig. 2, wherein the automatic cutout is operated by a relay;

In these drawings, the same reference character refers to the same part wherever used.

Figure 5:
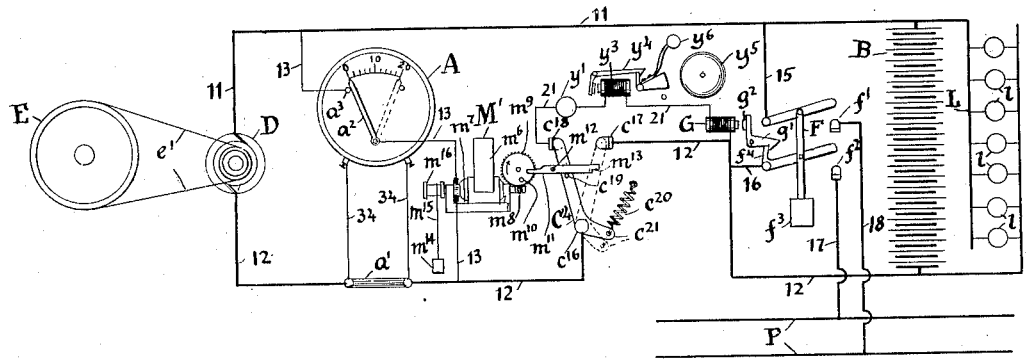
Fig. 5 is a still further improved and more elaborated form of the invention showing other alternative arrangements.

Referring first to the simple form of my invention illustrated in Fig. 1, E represents an internal-combustion engine, D a dynamo connected therewith by a belt $e'$, B a storage-battery which is connected in parallel with the dynamo through the circuit-leads 11, 12, and L a service-circuit, in which may be translating-devices $l$ such as lamps, motors, etc. In this figure all accessory devices such as are commonly used in such circuits are omitted as nonessential to the invention.

The main principle of the invention consists in intercalating on one side of the circuit 11, 12, an automatic time-cutout, the same being adapted whenever the current runs from the battery to the dynamo for a predetermined length of time to open the circuit and thus cut off the battery from the dynamo. The form of such device here shown consists of an electric motor M, the armature $m'$ of which is intercalated in the main circuit-lead 12, while the field thereof is excited separately or by means of the shunt-circuit 13. One end of the shaft $m^2$ of the motor M is formed with a screw-stem $m^3$, on which is mounted a nut $m^4$, which has a slidable engagement with a rod $m^5$ to prevent it from turning. In the path of the nut $m^4$ is one arm $c'$ of a cutout C pivoted at $c^2$ and adapted to make electrical contact when in the lowered position with a contact-piece $c^3$, but when it is raised and out of contact with the latter, its end engages with a hooked catch $c^4$. This cutout C is also inserted in the main circuit-lead 12 whereby it can open and close the main circuit.

The action of this device is as follows: Supposing the circuit to be open, the arm of the cutout C being in the raised position; if it be now desired to start the engine in order to charge the battery or furnish the service-circuit with current, the cutout arm C is manually closed, and as the dynamo is standing, this will of course send the current from the battery into the dynamo and start the latter, which will in turn start the engine. After a few turns the engine, if in working order, starts itself and drives the dynamo at a speed sufficient to raise its potential high enough to reverse the current and effect the purpose named. Now as soon as the cutout C is closed, the current passing through the circuit-lead 12, will start the motor in a direction such that it will cause the nut $m^4$ to travel toward the arm $c'$, but before it reaches said arm the engine, being in working order, will have reversed the current and thereby stopped the armature $m'$ and reversed its direction so as to carry the nut $m^4$ back to the starting-point again. In this case my device will be ineffective to open the circuit. But if the engine E, after the predetermined interval of time provided for by the design of the motor M, screw-stem $m^3$ and nut $m^4$ fails to drive the dynamo, the current will continue to flow toward the dynamo and the nut $m^4$ will continue to travel to the right until it strikes the arm $c'$, and will thereupon throw the cutout-arm C up so as to open the circuit and engage the arm with the catch $c^4$. The dynamo cannot become cut back into circuit except manually, and the operation of the cutout gives notice to the attendant that repairs are needed on the engine.

The hook-catch $c^4$ can be dispensed with in this form of the device inasmuch as the nut $m^4$ will serve to hold the cutout C in open position until the motor-armature $m'$ is manually turned back.

In Fig. 2 another embodiment of the same principle is shown, the engine, dynamo, battery, service-circuit and main leads being the same as previously and so designated. In this case, in place of the motor M, I may use an electromagnetic coil or solenoid S having a core $s'$ provided with a winding which is placed in the shunt-circuit 13 the same as the field of the motor M. Said core $s'$ is supposed to rise and fall in obedience to the resultant attraction of the solenoid and gravity, and the direction of the windings is such that when the current flows from the battery toward the dynamo, as in starting the engine, the solenoid will attract and raise its core $s'$, but when said current is in the opposite direction, it will repel the latter and cause it to descend. The core operates an arm $s^2$ pivoted at $s^3$ which in turn operates the cutout-arm $C'$ pivoted at $c^5$ and having a laterally projecting lug $c^6$ which the arm $s^2$ strikes in its upward movement, thereby shifting it from the terminal plate $c^7$ to the terminal-plate $c^8$. The ends of the lead 12 are connected to the terminal $c^7$ and the arm $C'$ as shown, so that the circuit is closed in the full-line position of the cut-out-arm. To provide the time-element a retardation-cylinder or dash-pot T is shown and the solenoid-core $s'$ has a depending stem $t'$ with a piston $t^2$ on the end, said piston $t^2$ filling the bore of the dash-pot T and having a small hole $t^3$ through it or other means of permitting a retarded flow of the fluid filling the cylinder from the upper to the lower side of the piston when the dash-pot rises. The fluid used for this purpose may be air, water, glycerin, oil, or any other suitable material, and the size of the hole $t^3$ will of course be adjusted to the character of the fluid and the time which is to be allowed for the device to act.

It will be obvious that when the circuit is closed as shown in the drawing, the solenoid S, when the current is from the battery to the dynamo, attracts and slowly raises its core, and unless by the driving force of the engine the current is reversed within the allotted time, the arm $s^2$ will strike the lug $c^6$ and throw over the cutout arm $C'$ to the right, thereby opening the dynamo-circuit and preventing any further current from flowing into the latter. Furthermore, the cutout-arm $C'$ will be thrown over onto the terminal $c^8$, and to this terminal is connected one end of a supplemental or alarm-circuit 14, which may contain various devices for performing such acts as may be appropriate; for example, an ocular signal $y'$ and an auricular signal $y^2$. The circuit 14 is further shown as containing an automatic device for cutting into the main circuit an emergency supply-circuit as for example, that supplied by public lighting-mains P. As exemplifying this I have shown a double-pole switch F, connected respectively to the lighting-mains 11 and 12 by wires 15 and 16, and the contacts $f'$ and $f^2$ of which are connected to the public-service wires P by branch-wires 17 and 18. The movable portion of the switch F is urged into the position to close said switch by the force of a weight $f^3$, but it is held out of such closed position by means of a trip $g'$ which engages a finger $f^4$ on one arm of the switch F, and said trip $g'$ carries also the armature $g^2$ of an electromagnet G which is intercalated in the circuit 14, so that when said circuit is closed by the action of the cutout-arm $C'$, said magnet G will attract its armature and throw out the trip $g'$, and the switch F will then be closed by the weight $f^3$ so as to permit the current from the lighting-mains P to supplement the battery. This last-named device may be cut out of circuit when not wanted by means of a short-circuiting lead 19 in which is intercalated a switch U.

Where the engine gets started before the solenoid core $s'$ has risen sufficiently to throw the cutout-arm, the core $s'$ will of course drop again as soon as the current reverses because of its fixed polarity. Whenever the device operates to cut out the engine, it will also cut in the signal circuit and give an alarm at the proper point and in the proper manner, besides, if desired, cutting in the public-service supply-system.

In Fig. 3 is shown an improved form of the device shown in Fig. 2. The arm $C'$ is replaced by an arm $C^2$, which has an extension $c^9$ extending laterally therefrom and screw-threaded to receive a weight $c^{10}$. The arm $c^2$ also has pivoted thereon a hooked pawl or catch $c^{11}$ which is adapted to engage by gravity with a stationary pin or other projecting element $c^{12}$. When the pawl $c^{11}$ is engaged with the pin $c^{12}$, the arm $c^2$ is held on the terminal $c^7$. The solenoid core $s'$ has in this case a laterally extending trip $s^4$ which is adapted to engage the projecting end of the pawl $c^{11}$ and throw it up, thereby releasing the member $C^2$, which is immediately thrown over onto the terminal $c^8$ by means of the weight $c^{10}$. When so thrown over, the cutout $C^2$ can be closed again only by hand.

In this figure also is shown another form of retarding-device by way of illustration in place of the dash-pot T'. The stem $t^4$ depending from the core $s'$ has rack-teeth $t^5$ formed on one side which engage with the first member of a gear-train $t^6$, the last member of which carries a fly $t^7$, this fly being arranged to rotate rapidly as the stem $t^4$ rises and thereby induce retardation in the well-known manner of such device. It will be clear that if the projection $s^4$ fails to reach the pawl $c^{11}$ before the current reverses, it will descend again without having changed the position of the cutout, but after having once disengaged the pawl $c^{11}$, the cutout is thrown over and can only be reversed by hand.

In Fig. 4 is shown how the same device as that just described may be operated by means of a relay, thus avoiding necessity of passing all the current generated through a solenoid S. In this case the cutout is in the form of a swinging bar $C^3$ which operates between the terminals $c^{13}$ and $c^{14}$ and is moved directly by a projection $t^8$ on the stem $t^9$ of the solenoid core $s^5$. The place of the solenoid S is taken by a shunt-wound solenoid S' and as for this no polarity is required, the core $s^5$ may be a plain iron core. A relay R having a polarized armature is inserted in the main circuit-lead 12, said relay having a rocking armature $r'$ adapted to be tilted to one side by a current in one direction and to the other side by a current in the other direction. The armature with its make-and-break contact $r^2$ is intercalated in the shunt-circuit 20, in which is also placed the coil of the solenoid S', so as to energize or deënergize the latter in accordance with the direction of the main current, it being understood of course that the solenoid S' is to be energized when the current is from the battery to the dynamo. Retardation is here effected by means of an escapement $T^2$ acting on the serrated edge $t^{10}$ of the stem $t^9$ and on the oscillating shaft of which are placed weights or pendulum bobs $t^{11}$ to give the necessary moment of inertia. In this case a hooked pawl $c^{15}$ is provided on the terminal $c^{14}$ so as to hold the arm $C^3$ in its raised position when the solenoid-core $s^5$ drops after opening the switch.

In Fig. 5 is shown a more complete and practical form of my invention than in either of the preceding figures, and in this case the operation of the cutout-device is conditioned by means of an ammeter A and a special form of timing-device M'. This timing-device comprises a small motor (which may be of the miniature class) having a field magnet $m^6$. On the armature-shaft of this motor at one end is a worm $m^8$, and a worm-wheel $m^9$ is turned thereby, said worm-wheel having on one face a projecting pin $m^{10}$. Adjacent to this face is located the nose of a trip-bar $m^{11}$, pivoted at $m^{12}$ and adapted to act upon the arm $c^4$ of the main cutout, which is pivoted at $c^{16}$ and adapted to make contact with either of the two terminals $c^{17}$, $c^{18}$, the former of which belongs to the main circuit as shown. The arm $m^{10}$ has a notched end $m^{13}$, and the arm $C^4$ has a pin $c^{19}$ with which said notched end is adapted to engage when the arm $C^4$ is in the dotted-line position. Means are applied to the cutout-arm $C^4$, such as a coiled tension-spring $c^{20}$ connected to an auxiliary arm $c^{21}$, for causing the arm $c^4$ when released by the raising of the notched end $m^{13}$ of the trip $m^{11}$ to shift from the terminal $c^{17}$ to the terminal $c^{18}$, and this disengagement is effected by the pin $m^{10}$ in the revolution of the worm-wheel $m^9$ in the direction of the arrow, striking on the upper side of the trip-bar $m^{11}$ and thereby tilting up the notched end. The connections of the motor-armature $m^7$ are such that when in circuit it drives the wheel $m^9$ in this direction, and when cut out of circuit again it is automatically turned back by a weight $m^{14}$ on the end of a cord $m^{15}$, which winds around a drum $m^{16}$ on the armature-shaft, thereby acting in the reverse direction to the current.

The actuation of the time-device is effected by the ammeter A, which may be connected by leads 34 across a shunt $a'$ on one side of the main circuit, and the needle $a^2$ is intercalated in the shunt-circuit 13 of the motor as shown, the circuit of the motor being closed by the contact of the needle with the rest $a^3$ on the low side, which may be at or about the point of zero current. It will be seen that whenever the current in the positive direction, that is to say, from the dynamo into the line, is reduced to zero, the circuit 13 of the timing-device is made, and after the predetermined interval necessary for the motor to turn the gear-wheel $m^9$ sufficiently to strike the upper side of the trip $m^{11}$ the cutout arm $C^4$ is thrown over by the action of the switch-spring $c^{20}$ and the dynamo-circuit broken, but if the condition of negative or zero current does not last for said predetermined interval, the needle $a^2$ of the ammeter breaks the circuit of the motor M' and the wheel $m^9$ is turned back again by the action of the weight $m^{14}$.

The auxiliary or alarm-circuit 21, is in this case made to connect the terminals $c^{17}$ and $c^{18}$, so as to span the break when the cutout-arm $C^4$ acts, and the signaling devices therein are substantially the same as in Fig. 4 except that in this case is shown in place of the vibrating bell $y^2$ a single-stroke signal consisting of the coil $y^3$, pivoted trip $y^4$ actuated thereby, gong $y^5$ and hammer $y^6$.

Figure 6:
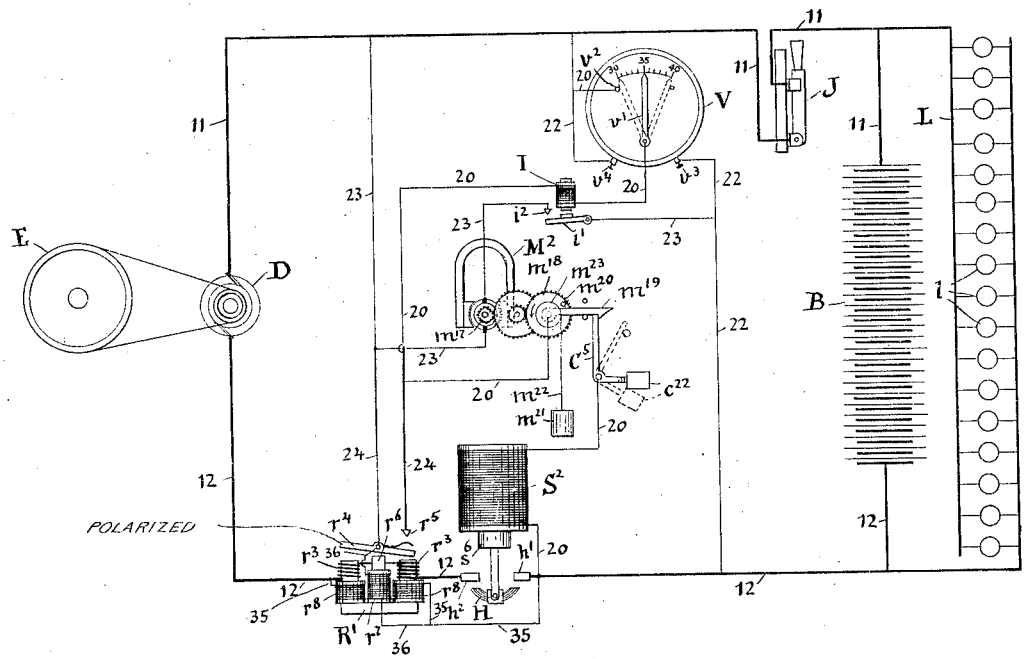
Fig. 6 shows a still further elaborated form of the invention in which provision is made for cutout in case of reversal of current.

In Fig. 6 I have illustrated an arrangement adapted not merely to cut out the dynamo-circuit when the engine fails to drive, but also to cut it in automatically when the potential of the battery decreases to a predetermined minimum. In this case I employ an electromagnetically operated main switch, which for the sake of illustration is shown as a shunt-wound solenoid $S^2$ acting on a core $s^6$ to raise it when energized, said core carrying the electrically conducting cross-member H which, when raised, electrically connects the terminals $h'$ and $h^2$ intercalated in the main circuit-leads 12. Also intercalated in said lead are the series coils $r^3$ of an electromagnet R' which has a tilting armature $r^4$ polarized with consequent polarity and adapted to tilt to one side or the other according to the direction of the current and thereby make electrical contact with a contact-piece $r^5$. In order to hold the polarity of the armature $r^4$ as against the opposite magnetic inductions produced by the two cores of the magnet, I provide a third core $r^6$ which is wound with a shunt coil $r^7$, connected across the main-circuit by leads 36. I also provide shunt-coils $r^3$ on the two magnetic cores, which are connected across the terminals H', H² by circuit-leads 35 to effect the action of the armature $r^4$ when the switch H is open, thereby maintaining the switch $r^4$, $r^5$, in the open position when the voltmeter needle closes the circuit 20, when the battery falls below the minimum voltage, to thereby energize the main switch solenoid S² and start the engine through the motor action of the dynamo D.

In the shunt circuit 20 of the solenoid S² are intercalated (1) the cutout-arm C⁵ of my time-switch; (2) an electromagnet I, and (3) the needle $v'$ of a voltmeter V, which acts as a circuit-closer by contact with the low-point rest $v^2$. Said voltmeter V is of course connected by its terminals $v^3$ and $v^4$ and leads 22 across the leads 11 and 12 as usual.

A different form of the time-cutout is here shown. The small motor M² thereof (which may have a permanent magnetic field though this is not essential), has on its armature-shaft a gear-pinion $m^{17}$ which meshes with and turns, either directly or through intermediate gears, a gear-wheel $m^{18}$, on the shaft of which is located the hooked-catch $m^{19}$ adapted to engage the end of the arm C⁵ or a projection thereon, and when said wheel $m^{18}$ revolves in direction of the arrow, a pin $m^{20}$ thereon strikes the under side of the catch $m^{19}$, throwing it up and disengaging the arm C⁵, which is then shifted to the right by the weight $c^{22}$. This breaks the circuit 20 at that point. The electromagnet I has an armature $i'$ and a contact-piece $i^2$, which are intercalated in the circuit 23 of the motor M², so that when said magnet I is energized, said circuit 23 will be closed, and it follows that as soon as the circuit 20 energizing the electromagnet I is broken, either by the arm C⁵ or the needle $v'$, said magnet will be deënergized and the circuit 23 broken, thereby cutting out said motor, and thereupon it will be turned back to the starting-point again by the force of a weight $m^{21}$ at the end of a cord $m^{22}$ which is wound on a drum $m^{23}$ coaxial with the wheel $m^{18}$. Conversely, whenever the arm C⁵ is in the position shown in full lines and the voltage of the circuit decreases to or below the minimum so that the needle $v'$ strikes the rest $v^2$, the solenoid S² will attract its core $s^6$, closing the main switch H and thus setting the dynamo in motion, and concomitantly the magnet I will attract its armature $i'$ closing the circuit of the motor M², which will act to cut the circuit 20 at C⁵ and throw out the switch H at the end of the predetermined time, unless within that time the dynamo shall be driven fast enough to increase the voltage to a point where the needle $v'$ leaves the rest $v^2$, or unless the relay R' acts by reversal of the current to close switch $r^4$, $r^5$, and thus eliminate the time cut-out in the following manner: The circuit-break $r^4$, $r^5$ is connected in a special shunt-circuit 24 across a part of the circuit 20, so as when closed to short-circuit the voltmeter V and electromagnet I, and is so connected that when the circuit is from the battery to the dynamo (as when the latter is not running), the circuit 24 shall be open at the switch $r^4$, $r^5$, and when the current sets from the dynamo to the battery it shall be closed. As soon, therefore, as the engine picks up and drives the dynamo so that the direction of the current in the lead 12 is reversed, then the armature $r^4$ will be tilted so as to close the circuit 24, thereby short-circuiting the electromagnet I, thus cutting out the motor M², and stopping the operation of the time-cutout; then so long as the current remains in this direction, whatever may be the voltage, the dynamo will continue in circuit; but the instant the current reverses, whether due to failure of the engine or for any other reason, the circuit 24 is opened at switch $r^4$, $r^5$, and if the voltage be higher than the minimum, the switch H drops immediately, but if the voltage be at the minimum or lower it drops after the predetermined interval of time necessary for the acting of the cutout-arm C⁵. Should the dynamo-circuit be at any time opened except by the operation of the arm C⁵, it will be closed again as soon as the voltage of the battery has declined to the minimum, and the dynamo started. A hand-switch J in one of the main leads provides for cutting out the entire apparatus permanently whenever desired.

It will be obvious that, instead of using the ammeter A in Fig. 5, the voltmeter V of Fig. 6 might be used, in which case the continuance of the dynamo in circuit would be conditioned not upon the direction of the current but upon the voltage generated.

Figure 7:
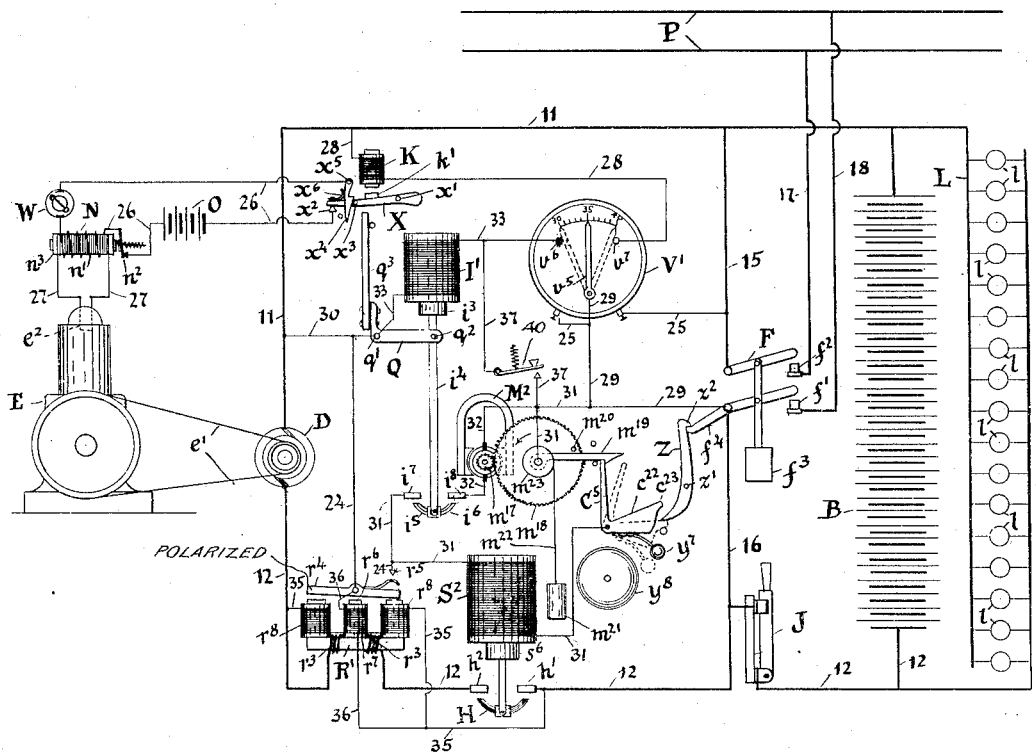
Fig. 7 illustrates the wiring and apparatus of a complete plant providing for automatic operation.

In Fig. 7 are shown the complete arrangements of a plant provided with an internal-combustion engine and a dynamo for charging the battery, with means for starting and stopping said engine automatically, and means for cutting out the dynamo-circuit in case of any undue reversal of current in the dynamo; also means for automatically cutting in an independent charging-circuit in case the engine or dynamo be temporarily disabled. In this case the engine is arranged to be started whenever the potential of the battery sinks below a predetermined minimum, and stopped when it rises above a predetermined maximum.

In this case the battery B, dynamo D, engine E, hand-switch J, service circuit L, time-cut-out-device $M^2$, cutout-arm $C^5$, reverse-current switch or relay $R'$, main switch H and solenoid $S^2$, are the same as in Fig. 6, but the arrangement of the connections and remaining elements is somewhat different. For the voltmeter V is substituted a voltmeter $V'$ connected across the main circuit-leads 11, 12 by the circuit-wires 25 as usual, and having its needle $v^5$ permanently connected by a lead 29 to one of them, as shown in this case the lead 12; while low and high rests, $v^6$, $v^7$, are provided on opposite sides of the needle, with which it makes contact at predetermined low and high voltages respectively, said rests being connected up in the manner which will now be described. Considering first the means for stoppng the engine in case the needle $v^5$ reaches the high point $v^7$, this is effected by cutting out the ignition-circuit of the engine, which will effectually stop it, and it will be understood of course that the engine itself may carry automatic devices for cutting off the fuel and oil and the like supplies in such case; none of which, however, are herein shown, as they form no part of this invention. The ignition-arrangements are illustrated conventionally as comprising a primary circuit 26 which includes a battery O, a timer W, the primary coil $n'$ of an induction-coil N, and a current interrupter $n^2$ belonging to the same; and a secondary circuit 27 including the secondary coil $n^3$ of the induction-coil and the ignition spark-plug $e^2$ of the engine. To open and close the primary circuit, there is provided a contact-bar X, pivoted at $x'$ and resting normally upon a contact-piece $x^2$; said bar having a projection $x^3$ with which a hooked catch $x^4$, pivoted at $x^5$, can engage when said bar is raised out of contact with the rest $x^2$; said catch being pressed against said projection $x^3$ by a spring $x^6$. The ends of the circuit 26 are connected respectively to the catch $x^4$ and the rest $x^2$. On the bar X is mounted the armature $k'$ of an electromagnet K, which is connected through a branch-circuit 28 with the main circuit-lead 11 and rest $v^7$ of the voltmeter $V'$; said circuit being completed, when the needle $v^5$ makes contact with said rest $v^7$, through the circuit-wire 29 with the negative lead 12; and in this case the electromagnet K will attract and raise its armature $k'$ and the bar X, thus breaking the ignition-circuit 26 and effectively stopping the engine.

The starting-devices comprise in this case, in addition to the devices $M^2$, $C^5$, $R'$, $S^2$ and H, connected up as presently described, an electromagnetic device $I'$, which replaces the device I of Fig. 6, and is here shown as a solenoid provided with a lift-core $i^3$. Said electromagnetic device performs three functions: first, to close the ignition-circuit opened by the electromagnet K; secondly, to close the main switch H; and thirdly, to start the motor $M^2$ or other time-element releasing the cutout-arm $C^5$. Said core $i^3$ carries a stem $i^4$, which is conducting and is electrically connected by the lead 30 with the main lead 11. It operates mechanically a bell-crank lever Q, pivoted at $q'$ and connected with it by a pin-and-slot connection $q^2$; said lever having an upright arm $q^3$ which is insulated as shown. Said upright arm $q^3$ projects into proximity with the contact-bar X, and is adapted, when the core $i^3$ is raised, to strike the depending end of the catch $x^4$ and move it out of the way of the projection $x^3$ so that the bar X falls and closes the ignition-circuit. The stem $i^4$ also carries on its lower end contact-fingers $i^5$, $i^6$, adapted to connect the lead 30, when the core $i^3$ is raised, with contact-pieces $i^7$ and $i^8$, the former of which forms the pole of a branch-circuit 31 extending to the lead 12 and containing the solenoid $S^2$ and cutout-arm $C^5$. The other contact-piece $i^8$ forms the pole of another branch-circuit 32 containing the motor $M^2$, which starts the automatic time-cutout in operation. The armature $r^4$ is arranged, as previously, by means of a branch-circuit 24 which it closes at $r^5$, to close the solenoid-circuit 31 independently of the closure $i^5$, $i^7$ when the current sets in the direction from the dynamo to the battery, but to open said shunt-circuit when the current is in the opposite direction.

The solenoid $I'$ is placed in a branch-circuit 33 which leads from the main circuit-lead 11 to the voltmeter rest $v^6$, hence the current from the solenoid passes through the needle $v^5$ and lead 29 to the main circuit-lead 12.

When, therefore, the voltage is depressed until the voltmeter-needle $v^5$ strikes the low-voltage rest $v^6$, the circuit of the solenoid $I'$ is completed, the latter raises its core, the arm $q^3$ disengages the trip $x^4$ whereby the ignition-circuit of the engine is closed, and the circuits 31 and 32 of the solenoid $S^2$ and motor $M^2$ are likewise closed; the circuit through solenoid $S^2$ passing from main 11, through branch 30, stem $i^4$, contacts $i^5$, $i^7$, branch 31, (including solenoid $S^2$, cut-out arm $C^5$, and catch $m^{19}$), branch 29 and lead 16 to the other main 12; the circuit through the motor $M^2$, passing from lead 11, through branch 30, stem $i^4$, contacts $i^6$, $i^8$, branch 32, (including the motor $M^2$), branch 31, branch 29, and lead 16 to main 12; the solenoid $S^2$ closes the main switch H, and the dynamo as a motor starts the engine in motion; simultaneously the motor $M^2$ starts the time-cutout in operation; and, assuming the engine picks up and drives, then the current reverses, the branch-circuit 24 is closed at $r^5$ by operation of the relay R', and this in turn holds the circuit 31 of the solenoid $S^2$ and the switch H closed; the voltage of the circuit rises as the engine gains speed, the needle $v^5$ leaves the rest $v^6$, solenoid I' drops its core $i^3$ and opens the circuit 32 thereby cutting out the automatic time-device or timing mechanism, and the latter returns to the starting-point under action of the weight $m^{21}$. This condition continues, the engine driving the dynamo and charging the battery and supplying the service-circuit, until the voltage has risen to a point where the needle $v^5$ strikes the high-pressure rest $v^7$, when the engine is automatically cut out again, and in this case, of course, the reversal of the current will open the branch-circuit 24 and the circuit 31 of solenoid $S^2$ and thereby the switch H, and this remains until the voltage drops again, and so on.

But if the engine fails to pick up and drive within the predetermined time, the circuit will be opened by release of the arm $C^5$ as hereinbefore described; and for the sake of illustrating how this action may also serve to sound an alarm and close an independent supply-circuit mechanically instead of electrically as shown in the previous figures, the weight-carrying arm $c^{22}$ of the cutout-arm $C^5$ is provided with a projection or trip $c^{23}$, which is adapted, as the arm swings over, to strike the end of a lever Z which is pivoted at $z'$ and has a hook $z^2$ on its upper end engaging the finger $f^4$ of the switch F, whereby it releases said switch on being struck by the projection $c^{23}$ and permits it to close and thereby connect the battery-mains 11 and 12 with the independent supply-circuit P; and the arm $c^{22}$ may carry a gong-hammer $y^7$ adapted to strike a gong $y^8$ and thereby give a signal.

When it is desired to start up the dynamo independently of the position of the voltmeter, this is effected by means of a shunt-circuit 37 cutting out the latter and containing a normally open key 40, on depressing which the circuit of the electromagnet I' is closed and the dynamo started in the same manner as previously described in the case of low voltage. Of course the finger can be released from the key 40 after the necessary time to start the engine, and the engine will continue to operate until stopped automatically.

From the foregoing description it will be clear that my invention may be embodied in a great number of different forms all based on the main principle thereof, and I do not limit myself, therefore, to special or detailed arrangements, such for example, as the construction and arrangement of the auxiliary alarm-circuit, etc.

Having thus described my invention, what I claim as new and desire to secure by Letters Patent is:

1. The combination of a battery, a dynamo, an electric circuit including both, an engine adapted to drive said dynamo, said engine adapted to be started by said dynamo driving it when acting as a motor, a cutout in said circuit adapted to open the circuit between said battery and said dynamo, an electro-responsive device actuated and controlled solely by the flow of current in the system adapted to open said cutout, and a timing mechanism actuated by said device to delay the operation of the cutout until said dynamo has failed for a predetermined length of time to generate a voltage above a predetermined minimum.

2. The combination of a battery, a dynamo, an electric circuit including both, an engine adapted to drive said dynamo, said engine adapted to be started by said dynamo driving it when acting as a motor, a cutout in said circuit adapted to open the circuit between said battery and said dynamo, an electro-responsive device actuated and controlled solely by the flow of current in the system to open said cutout, means acting only when said current falls below a predetermined algebraic minimum to energize said electro-responsive device, and a timing mechanism adapted to delay the action of said electro-responsive device for a predetermined interval of time.

3. The combination of a battery, a dynamo, an electric circuit including both, an engine adapted to drive said dynamo, said engine adapted to be started by said dynamo driving it when acting as a motor, a cutout in said circuit adapted to open the circuit between said battery and said dynamo, an electro-responsive device actuated and controlled solely by the flow of current in the system to open said cutout, means acting only when said current falls below a predetermined algebraic minimum to energize said electromagnetic device, and a timing mechanism adapted to delay the action of said electro-responsive device for a predetermined interval of time; said electro-responsive device being adapted when no longer under the influence of current below said algebraic minimum to return to its original position.

4. The combination of a battery, a dynamo, an electric circuit including both, an engine adapted to drive said dynamo, said engine adapted to be started by said dynamo driving it when acting as a motor, a cutout in said circuit adapted to open the circuit between said battery and said dynamo, a timing mechanism acting to open said cutout when the current in said circuit has continued in a direction from the battery to the dynamo for a predetermined interval of time, and a supplementary supply-system adapted to be cut into circuit with the battery by the opening action of said cutout.

5. The combination of a battery, a dynamo, an electric circuit including both, an engine adapted to drive said dynamo, said engine adapted to be started by said dynamo driving it when acting as a motor, a cutout in said circuit adapted to open the circuit between said battery and said dynamo, an electro-responsive device actuated and controlled solely by the flow of current in the system to open said cut-out, means acting only when said current falls below a predetermined algebraic minimum to energize said electro-responsive device, a timing mechanism adapted to delay the action of said electromagnetic device for a predetermined interval of time, and a signaling-device adapted to be actuated by the movement of said cutout device in breaking the circuit between the dynamo and the battery.

6. The combination of a battery, a dynamo, an electric circuit including both, an engine adapted to drive said dynamo, said engine adapted to be started by said dynamo driving it when acting as a motor, a cutout in said circuit adapted to open the circuit between said battery and said dynamo, an electro-responsive-device adapted to occupy a certain position when the potential of said circuit falls below a predetermined minimum, a contact-element with which said movable device is adapted to close a secondary electric circuit when it occupies said certain position, an electric circuit, one pole of which is connected to said movable element and the other pole to said contact-element whereby it is closed when said movable element occupies said certain position, a cutout-device adapted to cause the opening of the main cutout by its opening, a time-device adapted to open said cutout device after a predetermined interval of operation, said time-device being electrically governed and being caused to begin to operate by the closing of said secondary circuit, an independently acting circuit-closing device connected to a supplementary circuit in parallel with said movable element and contact-element and adapted to short-circuit the the latter when it is closed whereby to prevent the action of said time-element, and a polarized electromagnetic-device adapted to cause said independently acting circuit-closing device to assume a closed position whenever the current sets from the dynamo to the battery and an open position whenever it sets from the battery to the dynamo.

7. The combination of a battery, a dynamo, an electric circuit including both, an engine adapted to drive said dynamo, said engine adapted to be started by said dynamo driving it when acting as a motor, a cutout in said circuit adapted to open the circuit between said battery and said dynamo, an electro-responsive-device adapted to occupy a certain position when the potential of said circuit falls below a predetermined minimum, a contact-element with which said movable device is adapted to close a secondary electric circuit when it occupies said certain position, an electric circuit one pole of which is connected to said movable element and the other pole to said contact-element whereby it is closed when said movable element occupies said certain position, a cutout-device adapted to cause the opening of the main cutout by its opening, a time-device adapted to open said cutout-device after a predetermined interval of operation, said time-device being electrically governed and being caused to begin to operate by the closing of said secondary circuit, an independently acting circuit-closing device connected to a supplementary circuit in parallel with said movable element and contact-element and adapted to short-circuit the latter when it is closed whereby to prevent the action of said time-element, and a polarized electromagnetic-device adapted to cause said independently acting circuit-closing device to assume a closed position whenever the current sets from the dynamo to the battery and an open position whenever it sets from the battery to the dynamo; in conjunction with a second supplementary circuit, a second contact-element with which said movable element is adapted to make contact when the potential of the battery circuit reaches a maximum limiting-value, said last-named contact-element and movable element being respectively connected to the terminals of said second supplementary circuit whereby to close the same in such case, an ignition-circuit the closure of which conditions the operation of the engine, a cutout-switch in said circuit, an electromagnetic device in said second supplementary circuit adapted when the latter is closed to open said cutout-switch, means for holding said cutout-switch in open position after being so opened, and means caused by the closure of said first-named secondary circuit for causing the reclosure of said cutout-switch whereby said ignition-circuit is closed.

In witness whereof I have hereunto set my hand in the presence of two witnesses:

JULIUS H. GUGLER.

Witnesses.
KATHERINE MEHEGAN,
W. H. CAMERON.